US005438553A

United States Patent [19]
Wilson et al.

[11] Patent Number: 5,438,553

[45] Date of Patent: Aug. 1, 1995

[54] TRANSDUCER

[75] Inventors: David T. Wilson, Billerica; Roger H. Tancrell, Cambridge, both of Mass.

[73] Assignee: Raytheon Company, Lexington, Mass.

[21] Appl. No.: 525,355

[22] Filed: Aug. 22, 1983

[51] Int. Cl.[6] .............................................. H04B 17/00

[52] U.S. Cl. .................................... 367/140; 367/141; 367/157; 367/163; 250/338.3; 310/800

[58] Field of Search ................ 310/800; 367/140, 141, 367/149, 153, 155, 157, 160, 161, 163, 367, 180; 73/646; 374/32; 250/338 P, 338.3

[56] References Cited

U.S. PATENT DOCUMENTS

| | | | |
|---|---|---|---|
| 2,637,823 | 5/1953 | Anderson et al. | 367/141 X |
| 3,971,250 | 7/1976 | Taylor | 310/800 X |
| 4,204,135 | 5/1980 | Murayama | 310/800 X |
| 4,284,921 | 8/1981 | Lemonon et al. | 310/800 |
| 4,345,359 | 8/1982 | Micheron | 310/367 |
| 4,405,402 | 9/1983 | Quilliam | 310/800 X |
| 4,443,730 | 4/1984 | Kitamura et al. | 310/800 |
| 4,486,869 | 12/1984 | Carter | 367/155 |

OTHER PUBLICATIONS

*New Methods of Ultrasonoscopy and Ultrasonography* by Ernst et al. J. of Acoustical Society of America V. 24 N. 2 Mar. 1952 pp. 207–210.

Piezoelectric Polymers Properties and Potential Applications 1977 Ultrasonic Symposium Proceedings pp. 344–346 by Masahiko Tamura.

*Primary Examiner*—Harold J. Tudor

*Attorney, Agent, or Firm*—Donald F. Mofford

[57] ABSTRACT

A transducer having an energy conversion medium for converting changes in applied mechanical energy into corresponding changes in thermal energy and a pyroelectric material in thermal energy transfer relationship with the energy conversion medium for producing an electrical output substantially in response to the converted thermal energy. Such transducer is particularly useful as a hydrophone in detecting low frequency sound waves emitted by, or reflected from, underwater objects.

49 Claims, 5 Drawing Sheets

TRANSDUCER

BACKGROUND OF THE INVENTION

This invention relates generally to transducers and more particularly to transducers adapted to detect sonic energy.

As is known in the art, transducers have a wide range of applications as, for example, hydrophones used to detect sonic energy associated with underwater objects. One such type of sonic device known in the art uses the piezoelectric properties of a ceramic material whereby an electrical signal is produced in such ceramic material in response to mechanical stress and corresponding strains produced in the ceramic material in response to longitudinal pressure waves associated with the applied sonic energy. Another material suggested for such piezoelectric sonic device is polyvinyledene-fluoride (PVDF) polymer as described in an article entitled "Model for a Piezoelectric Flexural Plate Hydrophone" by Donald Ricketts, published in the Journal of the Acoustic Society of America, Volume 70, No. 4, October 1981. A sheet of such PVDF material is coated on opposite surfaces with electrical conductive layers. The coated sheet is then submerged in an ocean body to detect sounds emitted by, or reflected by, underwater objects. These sounds cause stresses and strains in the PVDF material. A voltage is produced across the conductive layers which is related to the piezoelectric characteristics of the PVDF material to thereby detect these sounds. Because low frequency (less than 100 Hz) sound travels over long distances under-water without excessive attenuation and can be heard at long ranges, it is desirable to have sonar transducers which can effectively detect sonic energy at these low frequencies. While the piezoelectric sonic devices described above are useful in many applications, the detection of low frequency signals, i.e., those sonic signals having frequencies below 100 Hz, becomes difficult with such devices. For example, use of the PVDF polymer piezoelectric device in detection of these low frequency sonic signals generally requires a relatively thick polymer thereby increasing the cost of such device. Further, the ceramic piezoelectric devices inherently have a relatively limited low frequency response characteristic. Further, the ceramic piezoelectric sonic device is sensitive to accelerations and vibrations which may occur as a result of the mounting of such a piezoelectric device to the hull of a ship, for example, thereby interfering with the effective sonic detection sensitivity of the device.

SUMMARY OF THE INVENTION

In accordance with the present invention, a transducer is provided comprising: means for converting mechanical energy into thermal energy; and, means, comprising a pyroelectric material in thermal energy transfer relationship with the energy converting means, for producing an electrical output substantially in response to the converted thermal energy.

In a preferred embodiment of the invention, the transducer is used as a hydrophone and the energy converting means includes a medium which compresses and rarefies in response to compression and rarefication wavefronts of longitudinal sound waves emitted, or reflected, by an underwater object, such compression and rarefication wavefronts correspondingly increasing and decreasing the thermal energy of the medium. The pyroelectric material is in thermal conduction relationship with the medium. The temperature of such pyroelectric material increases and decreases correspondingly to the increases and decreases in the thermal energy of the energy conversion medium. Electrical charge distribution in the pyroelectric material changes in response to the temperature changes of the pyroelectric material to produce a corresponding electrical signal substantially related to the compressions and rarefications of the longitudinal sound waves.

With such arrangement, by using the pyroelectric characteristics of the material in detecting sound waves through the use of an intermediate energy conversion medium, an improved hydrophone is provided for detecting relatively low frequency sound waves and having relatively low sensitivity to accelerations and vibrations of a mounting vessel.

BRIEF DESCRIPTION OF THE DRAWINGS

The foregoing features of this invention, as well as the invention itself, may be more fully understood from the following detailed description taken together with the accompanying drawings, in which.

DESCRIPTION OF THE PREFERRED EMBODIMENTS

Figure 1:
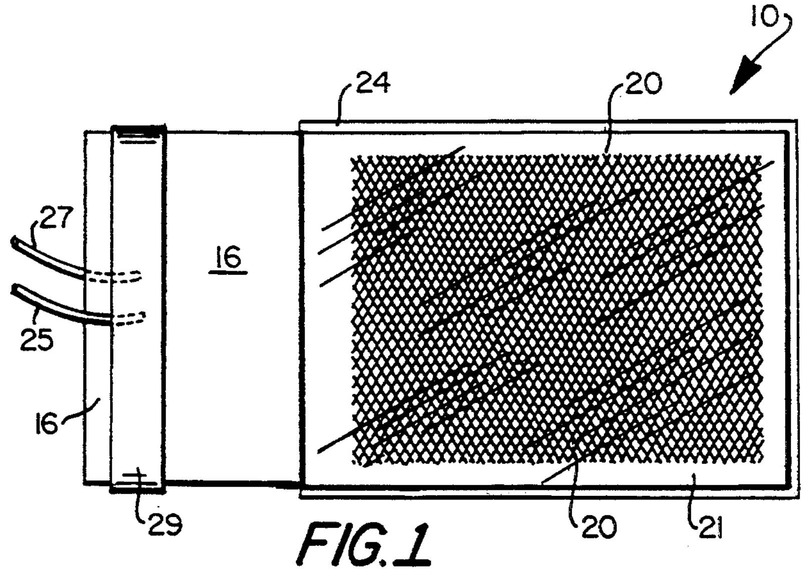
FIG. 1 is a plan view of a transducer according to the invention.
Figure 2:
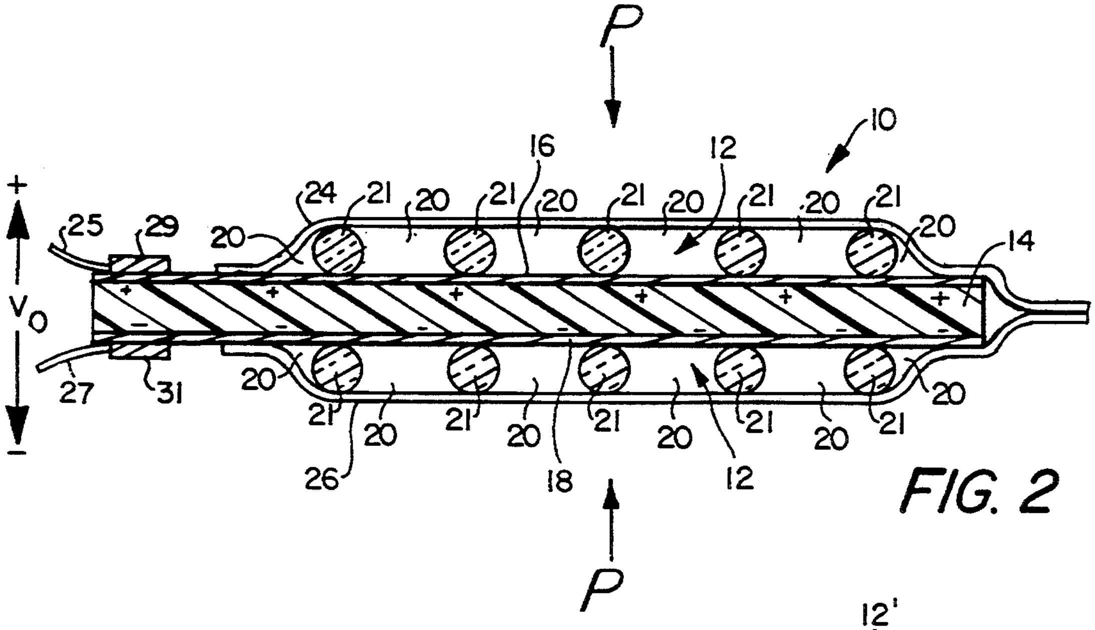
FIG. 2 is a cross-sectional diagrammatical sketch of the transducer of FIG. 1.

Referring now to FIGS. 1 and 2, a transducer 10 is shown to include: a mechanical energy to thermal energy conversion medium 12 for converting applied mechanical energy (such as, for example, mechanical energy in the form of impinging longitudinal pressure waves associated with sounds emitted, or reflected by, an underwater object as when such transducer 10 is used as a hydrophone in a sonar system) into thermal energy; and, a pyroelectric material 14, here a polarized polymer sheet of polyvinyledene fluoride (PVDF) disposed in thermal energy transfer relationship with the energy conversion medium 12, for producing an electrical output substantially in response to the thermal energy converted by the conversion medium 12. Hence, the electrical signal is produced in response to the sounds emitted by, or reflected by, the under-water object and which impinge upon the transducer 10. (It is here noted that each of the dimensions, i.e. length, width and thickness of the transducer 10 is small, in the order of two orders of magnitude less than (i.e. less than 0.01 times) the wavelength of the impinging longitudinal pressure waves. ) The pyroelectric material 14 is polarized in a direction generally perpendicular to the broad surface of the material 14 and is coated on the opposite broad surfaces with suitable electrically conductive layers 16, 18, as shown. A PVDF polymer with coated electrical layers 16, 18 suitable for use in the transducer 10 is here commercially available as KYNAR TM Piezo film from Pennwalt Corporation, 900 First Avenue, P.O. Box C, King of Prussia, Pa. 19406-0018. The energy conversion medium 12 is a compressible-rarefiable fluid, here air, confined or entrapped in chambers 20. The chambers 20 are provided by spaces or openings formed in a pair of layers 21 of a mesh of a fiber or metal (here a woven mesh of plastic commercially available from Wire Cloth Manufacturing Inc., 133 Kings Road, Madison, N.J. 07940) held adjacent conductive layers 16, 18 by flexible diaphragms 24, 26, here conventional pressure sensitive tape such as Scotch Brand cellophane tape sold commercially by Minnesota Mining and Manufacturing (3M) Company, Saint Paul, Minn. Thus, each chamber 20 has as sidewalls thereof meshes of the mesh layers 21, as outer surfaces thereof portions of the diaphragm disposed over the mesh layers 21, and as inner surfaces thereof portions of the conductive layers 16, 18 disposed under the mesh layers 21. The adhesive surfaces of the pressure sensitive tape forming diaphragms 24, 26 are disposed on the outer surfaces of the mesh layers 21 and the periphery of such tape 24, 26 is adhesively bonded to the portions of the conductive layers 16, 18 disposed adjacent the outer peripheral portions of the mesh layers 21. Thus, with the mesh layers 21 laid down over the conductive layers 16, 18, the pressure sensitive tape 24, 26 is then laid down over the mesh layers 21 with the result that the mesh layers 21 entrap portions of the surrounding air thereby forming a plurality of air filled chambers 20. In response to a pressure on the outer surfaces of the diaphragms 24, 26 indicated by the arrows, P, such as that pressure associated with the compression portion of a sonic wavefront, the volume of the enclosed or entrapped air in chambers 20 decreases thereby compressing the entrapped air. As a result of this compression, the temperature of the air in the chambers 20 increases, thereby increasing the thermal energy of the air. Conversely, when the pressure P is less than the pressure of the air within the chambers 20, 22, such as that pressure associated with the rarefied portion of a sonic wavefront, the volume of the enclosed air increases or rarefies, thereby reducing the thermal energy of the air. Thus, the oscillatory mechanical energy used in compressing and rarefying the enclosed air changes, correspondingly, the thermal energy of the air. Considering a transducer 10 having as the fluid a gas, for purposes of analysis, it is assumed the compression-rarefication process is substantially adiabatic, a change in pressure $\Delta P$ changes the temperature of the gas $\Delta T_g$ in accordance with:

$$\Delta T_g/\Delta P=[\text{and } \gamma-1)/\gamma][T_o/P_o] \qquad \text{Equation (1)}$$

where:

$\gamma$ is the ratio of the specific heat of the gas under constant pressure (i.e. $C_p$) to the specific heat of the gas under constant volume (i.e. $C_v$); $T_o$ is ambient temperature of the gas and $P_o$ is ambient pressure of the gas. The thermal energy oscillations produced in response to the sound wave energy are transferred, here by thermal conduction, to the PVDF polymer pyroelectric material 14. The heat transfer between the polymer material 14 and the gas of the conversion medium 12 is a function of the specific heats, densities and thermal conductivities of the material of the mesh layers 21, the entrapped gas 12, and the polymer material 14. Thus, it is here noted that the mesh layers 21 not only function to support the diaphragms 24, 26, entrap the gas, and thereby support the gas chambers, but material in the mesh layers 21 also increases the heat conduction of the entrapped gas to the PVDF material 14 mesh as conventional heat fins.

Considering next the pyroelectric material 14, such material 14 develops electrical charges on the outer broad surfaces thereof in response to a change in the temperature of such material 14 thus producing a corresponding electrical potential (i.e. voltage $V_o$) between the outer surfaces of the material 14 and, hence, the voltage ($V_o$) between the conductive layers 16, 18. This voltage is electrically coupled from transducer 10 by conductive wires 25, 27 fastened to the conductive layers 16, 18 in any conventional manner, here by conductive (copper) adhesive tape 29, 31, as shown. The relationship between a change in temperature $\Delta T_p$ of the pyroelectric material 14 and the electrical charge developed on the outer surfaces of such material 14, per unit surface area of the material 14, is expressed by the pyroelectric activity constant, or pyroelectric coefficient, p (coulombs per square meter per change in degree Kelvin) of the material 14. Thus, the voltage, $V_T$, produced in response to a temperature change $\Delta T_p$ in the pyroelectric material 14 may be expressed as:

$$V_T=p(\Delta T_p)d/e \qquad \text{Equation (2)}$$

where:

d is the thickness of the pyroelectric material 14; and, e is the dielectric constant of such material 14.

It should be noted that the polymer PVDF material 14 in addition to having pyroelectric characteristics also has piezoelectric characteristics. That is, an electrical charge is also produced on the outer surfaces of the material 14 in response to changes in mechanical stresses and strains on the PVDF material itself. The electrical output $V_m$ of the PVDF material 14 resulting from its piezoelectric (mechanical) characteristic may be expressed as:

$$V_m=d_h\Delta P\, d/e \qquad \text{Equation (3)}$$

where $\Delta P$ is the change in pressure (Newtons per square meter; i.e. Pascals) on the surface of the PVDF material 14 and $d_h$ refers to hydrostatic sensitivity (Coulombs per Newton) and is equal to $d_h=d_{33}+d_{31}+d_{32}$ as described in an article entitled "Piezoelectricity in Polyvinylidene Fluoride" by G. M. Sessler, Journal of Acoustic Society of America, 70(6), December 1981, beginning at page 1596. Here, however, rather than have the sonic waves striking the PVDF material directly, and thereby detecting such sonic waves by producing an electrical output substantially in accordance with the piezoelectric characteristics of the material (i.e. electrical output in response to the mechanical stresses and strains produced in the PVDF material resulting directly from the longitudinal compression-rarefication wavefronts of the sound waves), the energy conversion medium 12 is used as an interface between the sound waves and the PVDF material 14 to convert the impinging sound waves into corresponding thermal energy. The PVDF material then produces an electrical output substantially in accordance with the pyroelectric characteristics of the material 14 (i.e. an electrical output in response to temperature changes in the PVDF material 14 which are produced as a result of the compression-rarefication wavefronts of the sonic waves compressing and expanding the conversion medium and which are subsequently thermally transferred to the PVDF material 14).

Thus, in response to impinging sonic energy, transducer 10 produces an electrical output ($V_o$) as a result of both the piezoelectric characteristics of the PVDF material 14 as well as the pyroelectric characteristics of the material 14. The total electrical output $V_o$ produced by the transducer 10 thus is the sum of the output $V_T$ and $V_m$ as represented in Equations (2) and (3) above. As will be shown below, however, the temperature change in the PVDF material 14 as a result of the energy conversion medium 14 causes a larger output voltage than that caused by a pressure change directly; that is, $V_T$ is much greater than $V_m$. For example, to illustrate this effect, a specific case will be considered; more particularly, the case of air entrapped in the meshes of mesh layers 20, as described above. (It is here noted that other gases may be considered for the conversion medium as well as certain organic liquids and elastomers). If the pressure of the sonic energy is assumed to change slowly, the temperature of the pyroelectric material 14 may be considered as having substantially the same temperature as the surrounding entrapped air and it may be assumed that the temperature of the material 14 would follow the change in the temperature of the air. The PVDF material 14 here has a pyroelectric coefficient, p, of 23 to 27 microcoulombs per square meter per degree Kelvin and a static piezoelectric strain constant, $d_h$ of 15 to 20 picocoulombs per Newton. The polymer PVDF material 14 has a sensitivity ratio of:

$$\frac{\text{hydrostatic sensitivity } (d_h)}{\text{pyroelectric coefficient } (p)} = \frac{0.5 \times 10^{-6}}{} \frac{(\text{degrees Kelvin})}{\text{Pascal}}$$

(1 pound per square inch of pressure is equivalent to 6,944 Pascals). From equations (1), (2) and (3) and assuming the gas and the pyroelectric material are in thermal equilibrium (i.e. $\Delta T_g \approx \Delta T_p$), the ratio of the output voltage from such material 14 due to heat ($V_T$) to the output voltage due to pressure ($V_m$) may be expressed as:

$$\frac{V_T}{V_m} = (0.5 \times 10^{-6})^{-1} ((\gamma - 1)/\gamma)(T_o/P_o) = 1700$$

Figure 3:
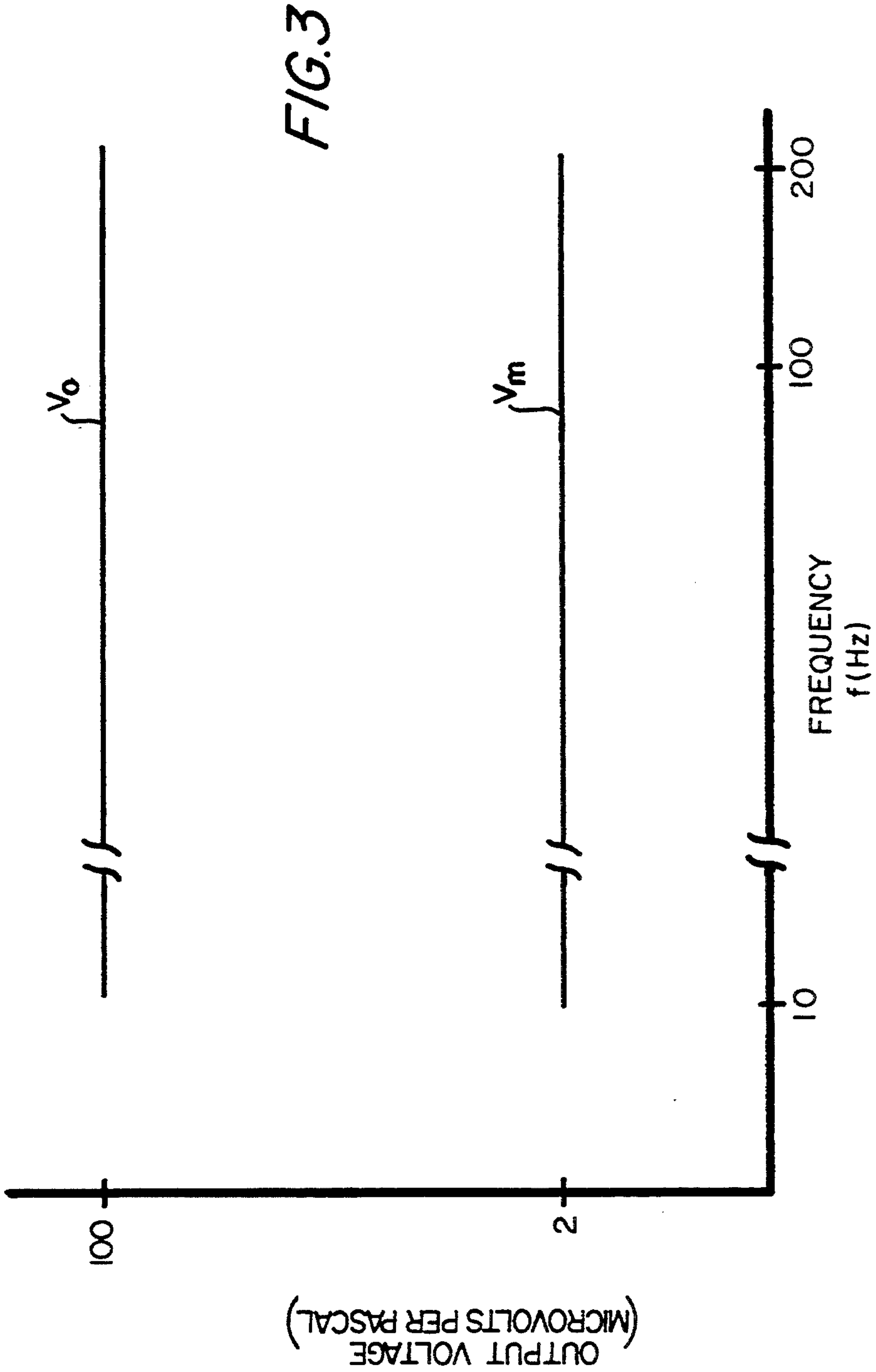
FIG. 3 is a curve showing the relationship between the electrical outputs of the transducer shown in FIGS. 1 and 2 compared with a transducer according to the prior art as a function of the frequency of sonic energy impinging on such transducers.

(where $T_o$ is assumed at room temperature, 300° K. and $P_0$ is atmospheric pressure, $1 \times 10^5$ Pascals and $\gamma$ is 1.4 for air). This large ratio (i.e. 1700) indicates that for the same thickness of PVDF material 14, such material can be made more sensitive to pressure when an intervening conversion medium 12 is used as compared with its direct detection of the pressure (i.e. detection of the pressure solely by the piezoelectric characteristics of the PVDF material). The ratio ($V_T/V_m$) is however generally lower in value because the temperature of the gas and the temperature of the pyroelectric material are not generally in thermal equilibrium because the heat generated in the air conversion medium does not typically have sufficient time to transfer totally to the pyroelectric material in each cycle of the oscillatory sonic pressure wave. Nevertheless, the pyroelectric output ($V_T$) is larger than the piezoelectric output ($V_m$) over a broad range of frequencies. FIG. 3 presents experimental data comparing the electrical outputs $V_o$ and $V_m$ from a layer of PVDF material with the air conversion medium 12 described above and without such medium 12 over a 4 octave bandwidth. The PVDF material 14 had a surface dimension of 10 cm by 20 cm, a thickness of 9 micrometers, and a pyroelectric constant of 23 to 27 microcoulombs $m^{-2}$ °K.$^{-1}$. The mesh layer 20 was synthetic (plastic) and had 24 meshes per linear inch, a wire diameter of 0.0075 inches, and a width opening of 0.0342". This experiment was conducted by filling a two-inch diameter beaker with oil and immersing the transducer 10 within the oil, the oil simulating the ocean. The beaker with the transducer 10 is then enclosed in an air-filled chamber 10 inches in diameter, the chamber being sealed with a 10-inch speaker disposed inside the air-filled chamber. The speaker is driven by an oscillator disposed outside the chamber and the electrical conductors on the transducer are coupled to a current amplifier outside the air-filled chamber. A calibrated microphone is disposed in the air-filled chamber and is electrically coupled out of the chamber with wires to measure the amount of pressure (here having a nominal value of 100 Pascals) in the air-filled chamber to provide a normalized electrical output (volts per Pascal). The normalized output of the transducer 10 with the air conversion medium is shown as curve $V_o$ (FIG. 3) and the normalized output of a transducer without such a conversion medium, i.e. the normalized output of sonic waves striking the PVDF material directly is shown as curve $V_m$ (FIG. 3). Thus, the experiment shows that, for the same thickness PVDF material 14, the electrical output resulting from the pyroelectric characteristics of the PVDF material 14 is substantially greater than the electrical output from the piezoelectric characteristics of such PVDF material.

Figure 4A:
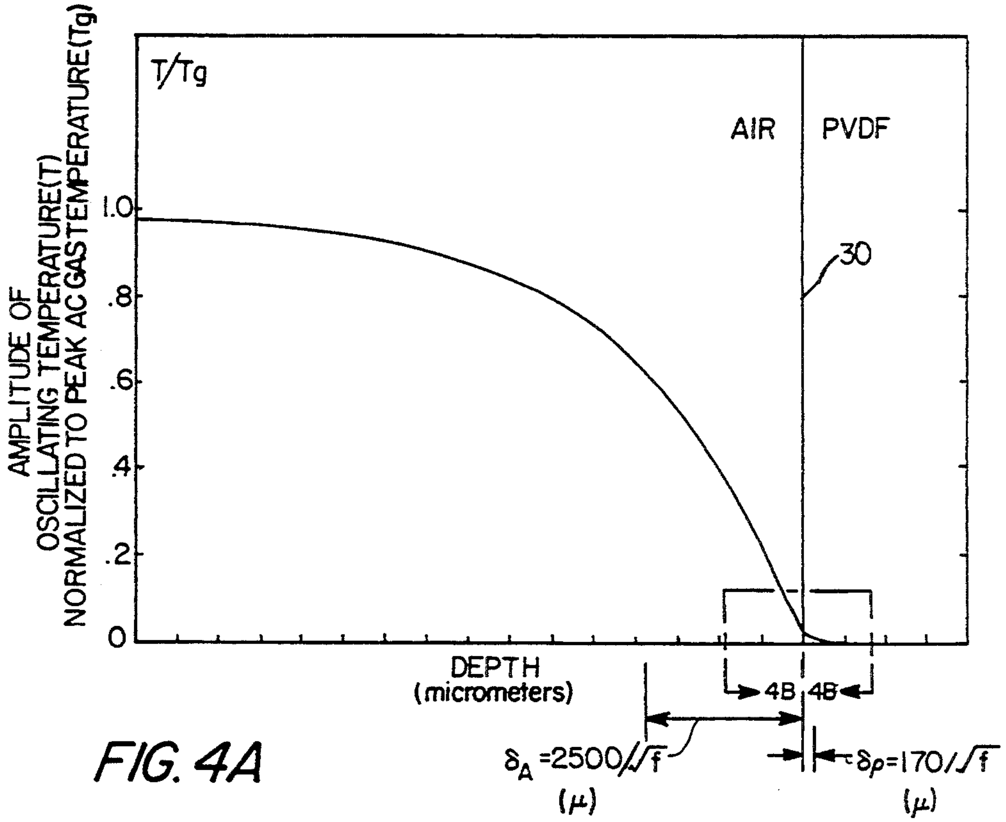
FIG. 4A is a theoretical curve useful in understanding the transducer of FIGS. 1 and 2.
Figure 4B:
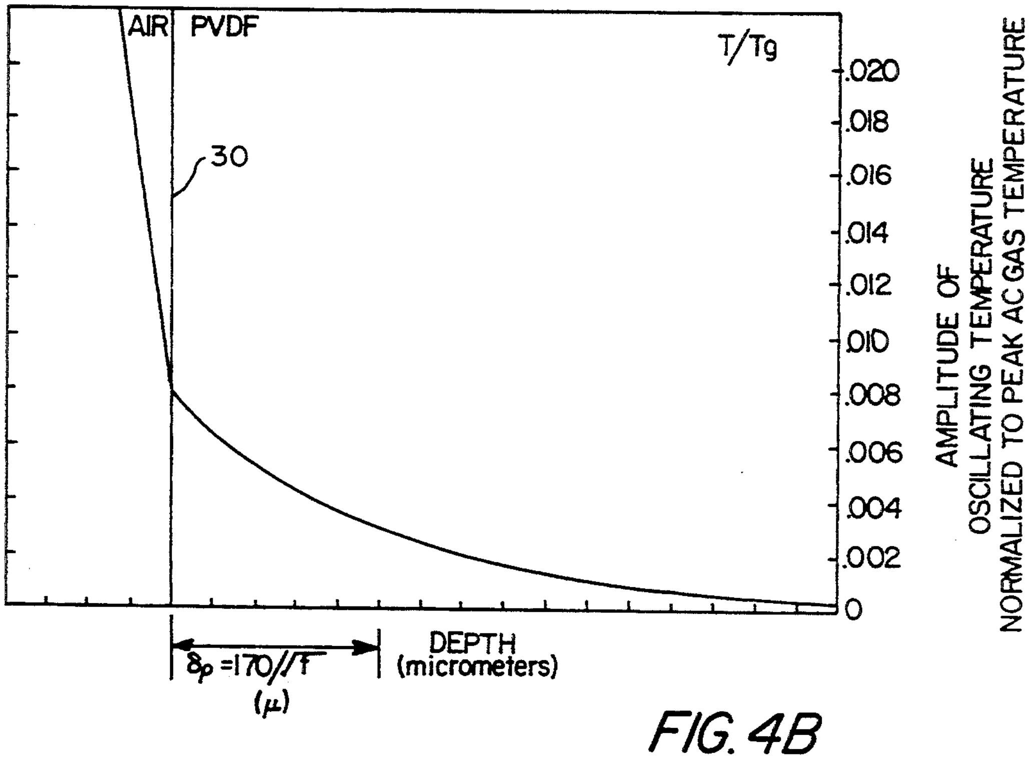
FIG. 4B is an enlargement of the portion of the curve shown in FIG. 4A enclosed by line 4B–4B.

Considering now the transfer of the heat in the gas to the pyroelectric polymer, as will be observed below only a relatively thin layer of the gas and a relatively thin layer of polymer are involved in this heat transfer process. Thus, referring now to FIGS. 4A and 4B, the heat dynamics of the transducer 10 in determining the optimum thicknesses of the layer of gas and the layer of PVDF polymer will be discussed. FIGS. 4A and 4B show the amplitude of oscillatory temperature (T) normalized to peak ac gas temperature $T_g$ as a function of the thickness of the gas (i.e. air) ($\delta_A$) and as a function of the thickness of the PVDF polymer material ($\delta$p). The interface between the air and PVDF material is indicated by vertical line 30. Thus, the slope of the curve is proportional to the heat transfer from the air conversion medium and to the PVDF material. The curve in FIGS. 4A and 4B is a result of a mathematical analysis of the heat flow predicated on oscillatory (ac) pressure and oscillatory temperature changes and such curve indicates that only a thin layer of gas and a thin layer of PVDF material contribute to the heat transfer process. The temperature distribution is shown in FIGS. 4A and 4B where a "skin depth" (i.e. $T/T_g=0.37$) at a nominal frequency, f, of 100 Hz in the air is 250 micrometers and in PVDF is 17 micrometers. FIGS. 4A and 4B show the case where a single interface is between air and PVDF. In the design of the device, therefore, a layer of air of approximately this thickness should be used. Using a thicker layer of air would have little advantage since only a thin region near the PVDF polymer would be able to transfer its heat to the PVDF anyway. On the other hand, the PVDF should be made as thin as practical (even thinner than the thermal skin depth) to minimize its heat capacity and maximize its temperature change. Further, for a particular pyroelectric material 14, a figure of merit (FOM) for a gaseous conversion medium may be expressed as:

$$FOM=[(\gamma-1)/\gamma][\rho C_p K]^{\frac{1}{2}} \quad \text{Equation (4)}$$

where $C_p$ is the specific heat of the gas; K is the thermal conductivity of the gas, and $\rho$ is the density of the gas.

Figure 5:
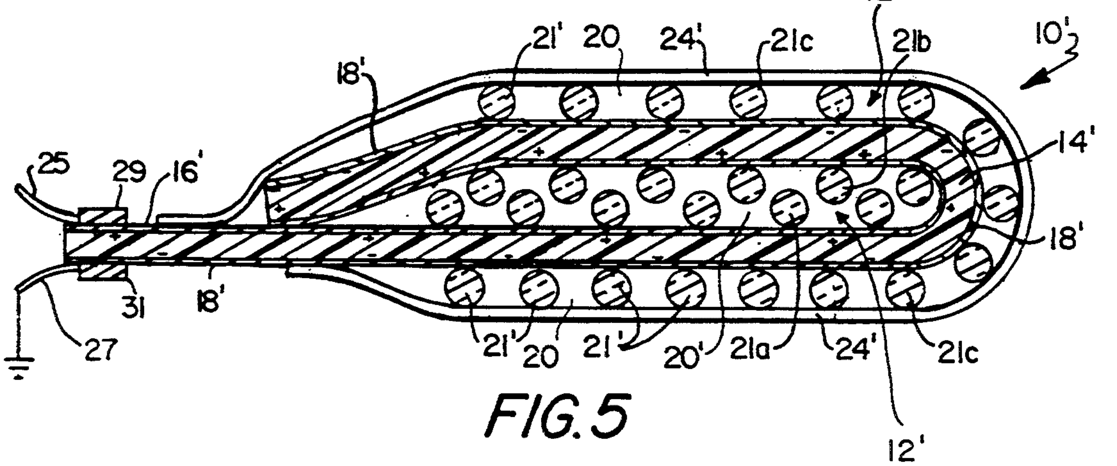
FIGS. 5 to 9 are diagrammatical sketches of alternative embodiments of transducers according to the invention.

Referring now to FIG. 5, an alternative embodiment of the invention is shown. Here a transducer 10′ with a layer 14′ of polarized PVDF material coated with electrically conductive layer 16′, 18′ similar to that shown and described in connection with FIGS. 1 and 2 has its conductive layers 16′, 18′ folded at one end as shown with a pair of overlaying layers of mesh layers 21*a*, 21*b* disposed between the fold, as shown. A third mesh layer 21*c* is wrapped around the surface of the conductive layer 18′, as shown. Finally, a diaphragm provided by pressure sensitive tape 24′ is wrapped around the outer surface of the third mesh layer 21*c* and is used to fasten the third mesh layer 21*c* and maintain the fold and shape of the PVDF material 14′, as shown, with the periphery of the tape 24′ being fastened to the left side portion of the conductive layers 16′, 18′ as shown. Thus, air is entrapped in an inner chamber 20′ formed by mesh 21*a* and conductive layer 16′ as well as an outer chamber 20 formed by the meshes of cloth 21′, tape 24′ and conductive layer 18′ thereby providing a medium 12′ for converting applied mechanical energy (i.e. sonic energy) into corresponding thermal energy. The converted thermal energy is then detected by the PVDF material 14′ as described in connection with FIGS. 1 and 2. With such arrangement, by grounding conductive layer 18′, a grounded electrical shield is provided around the active portion of the transducer 10′. That is, grounded conductive layer 18′ envelops the major portion of the PVDF material and conductive layer 16′.

Figure 6:
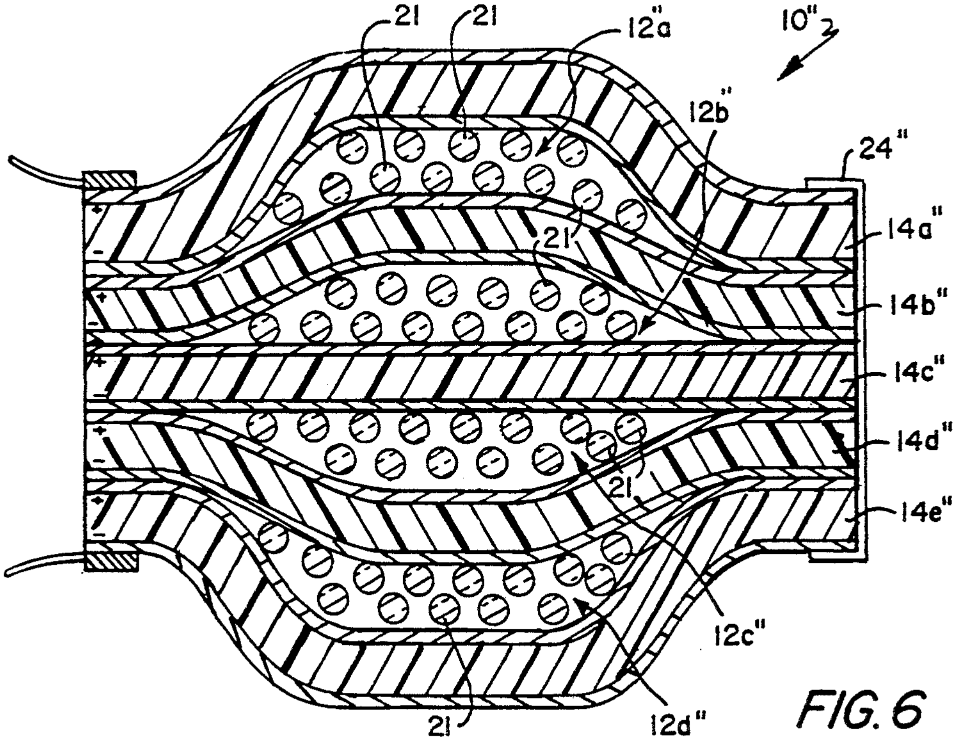
Figure 7:
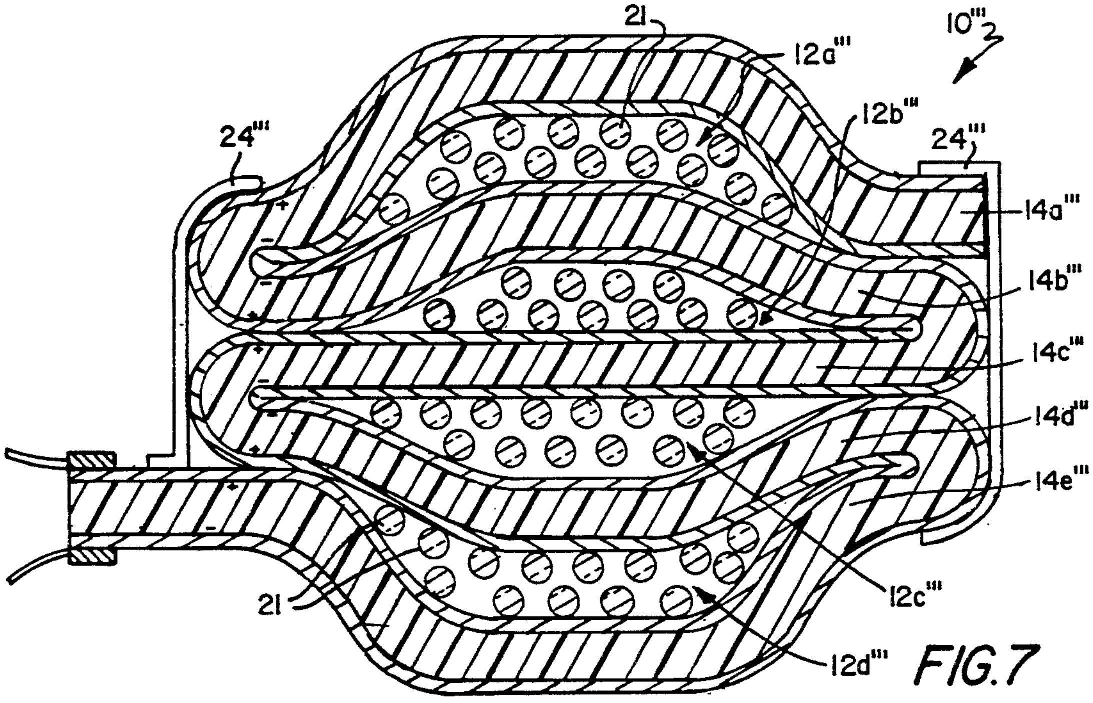

Referring to FIG. 6, another embodiment is shown. Here the transducer 10″ includes a plurality of, here 5, layers of metallized PVDF material 14″*a*–14″*e* separated by conversion media 12″*a*–12″*d* is shown held together by tape 24″. In this illustration, the polarity of adjacent sheets of PVDF (shown by + and −) are arranged so the electrical outputs are connected in series, thus increasing the voltage from the transducer 10″. While 5 layers have been shown, it is noted that the greater the number of layers, the greater the voltage produced by the device. An alternative parallel connection shown in FIG. 7 for transducer 10‴ which may be used to increase the output current and lower the device's electrical impedance. Here metallized the PVDF layer is folded into layer portions 14‴*a*–14‴*e* which are separated by conversion media 12‴*a*–12‴*d* as shown, held together by tape 24‴.

Figure 9:
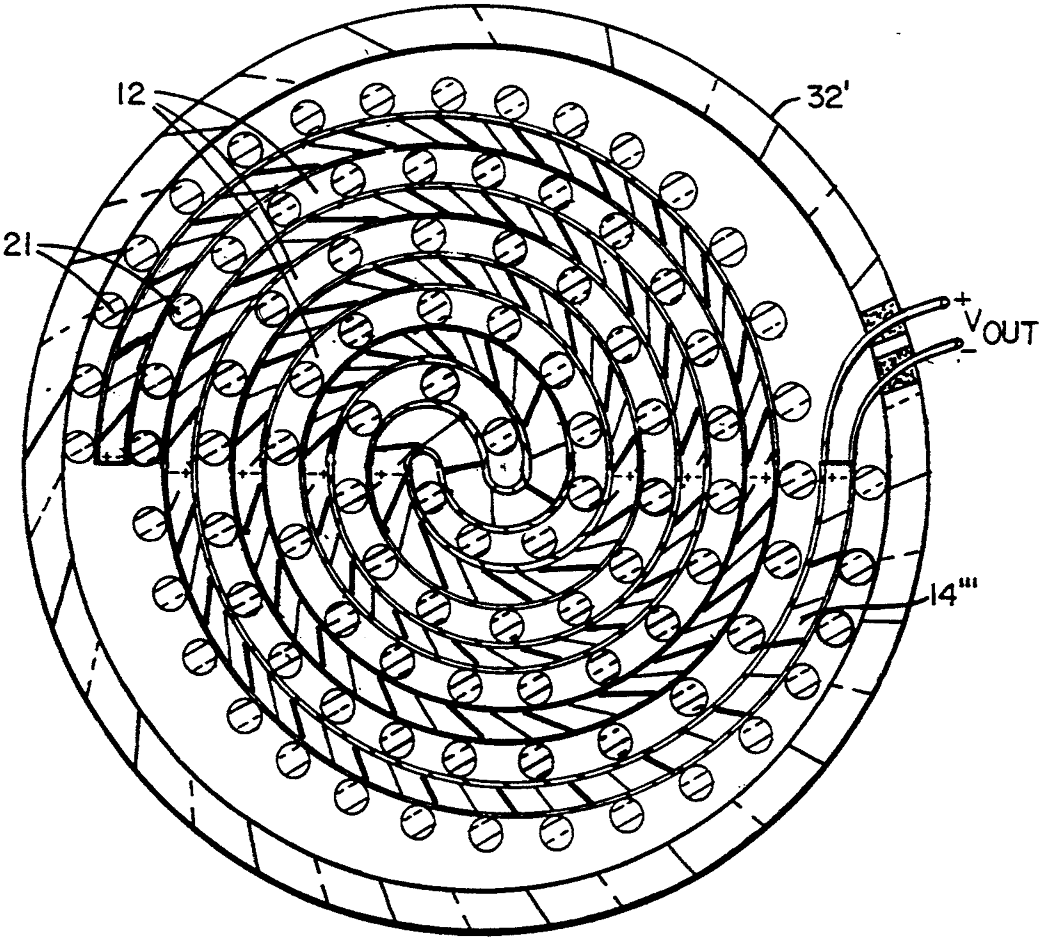
Figure 8:
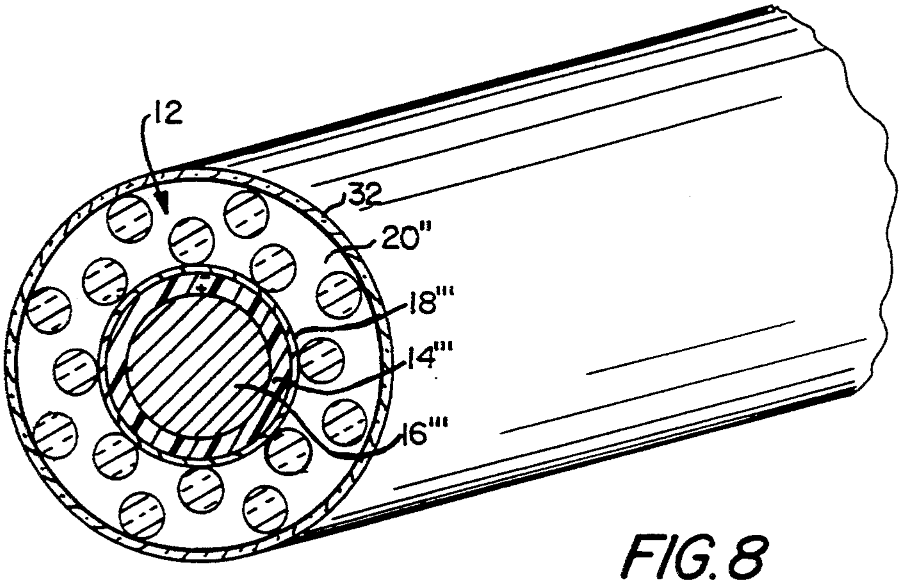

For some applications a coaxial "wire" type geometry is useful as shown in FIG. 8. Here a center conductor 16‴ is surrounded by a layer 14‴ of PVDF material having an outer conductor 18‴. The wire geometry is surrounded by a circular layer of air provided by air entrapped in meshes of cloth. An outer tube 32 is used to enclose the unit, as shown. Thus, the entrapped air in chambers 20‴ provides the energy conversion medium 12 as described in connection with FIGS. 1 and 2. An alternative embodiment of the transducer is illustrated in FIG. 9o Here a large sheet of metallized PVDF sheet 14‴ is rolled in a spiral with gas, here air, entrapped by meshes layer 21 between layer portions and enclosed in a tube 32′. The PVDF sheet is first folded in half substantially adjacent the center of the spiral before rolling so adjacent layers have opposite polarization indicated by + and −. If the electroded surfaces should accidently touch, no short circuit will occur because they are at the same potential. The more turns in the roll, the greater is the electrical output capacity (i.e. power) because the surface area of the PVDF is many times that of the tube's.

Thus, in summary, the use of an energy conversion medium 12 (i.e. air) in thermal heat transfer with a PVDF polymer allows such polymer to produce a relatively high electrical output in response to an impinging oscillatory mechanical input. Also, it is noted that thin layers of conversion medium and PVDF material are also desirable. The optimum thicknesses depend on the frequency of operation. Considering the figure of merit (FOM) Equation (4), if a helium conversion medium was used, the results expected would be greater by a factor of 2.5. Thus, in general, the selection of the conversion medium depends on the ease of fabrication, cost, long term stability of the medium, and the frequency of operation. Gases typically produce the larger transfer of heat to the polymer. Organic liquids and elastomers are other choices. They rise in temperature less than these gases, but can more readily transfer their heat to the polymer because they have greater heat conductivities. The important physical parameter in selecting a conversion are its ratio of specific heats ($\gamma$) (or its bulk expansion coefficient), its density, its specific heat and its thermal conductivity. The larger these quantities are, the more effective the conversion medium. It is further noted that the transducers so described above are typically encased in a conventional flexible boot to conform to the outer surface of the transducer for protection against the adversities of ocean water.

Having described preferred embodiments of the invention, it will now be apparent to one of skill in the art that other embodiments incorporating its concept may be used. For example, while the energy conversion medium 12 here includes a flexible diaphragm 24 and a mesh layer 21 with air entrapped gas, the mesh layer may be removed by using a flexible diaphragm which has sufficient self-support to enclose the gas, in which case, the thermal transfer to the polymer is primarily through the entrapped gas itself. Further, while the mesh layer 21 has been described as a plastic mesh layer, other materials such as metal having a relatively high thermal conduction characteristic may be used. It is felt, therefore, that this invention should not be restricted to the disclosed embodiment, but rather should be limited only by the spirit and scope of the appended claims.

What is claimed is:

1. A method comprising the step of sensing pressure produced thermal changes in a material having both pyroelectric and piezoelectric characteristics to detect such pressure, with an electrical signal produced having a first component produced as a result of the pyroelectric characteristic of the material which predominates over a second component of the signal produced as a result of the piezoelectric characteristic of the material.

2. The method recited in claim 1 wherein the material comprises polyvinyldene fluoride.

3. The method recited in claim 1 wherein the sensing step further comprises the step of:

converting the pressure into thermal energy to produce the first signal component in response to the converted thermal energy.

4. The method recited in claim 3 wherein the pyroelectric material comprises polyvinyldene fluoride.

5. A transducer comprising:

(a) means for converting mechanical energy into thermal energy; and (b) means, including a pyroelectric material disposed in thermal energy transfer relationship with the energy converting means, for producing an electrical output predominately in response to the converted thermal energy.

6. The transducer recited in claim 5 wherein the pyroelectric material comprises polyvinyldene fluoride.

7. The transducer as recited in claim 5 wherein the means for converting mechanical energy into thermal energy comprises:

a flexible diaphragm; and a compressible gas confined in a volume enclosed in part by the diaphragm and the means for producing an electrical output signal.

8. The transducer as recited in claim 7 wherein the means for producing an electrical output signal further includes a pair of conductive layers disposed on opposing surfaces of said pyroelectric material.

9. The transducer as recited in claim 8 wherein the pyroelectric material is polyvinyldenefluoride.

10. The transducer of claim 7 further comprising a thermally conductive mesh disposed between the flexible diaphragm and the means for producing an electrical output signal.

11. A transducer for producing an electrical signal in response to impinging sound waves comprising:

(a) means, including a medium which compresses and rarefies in response to compression and rarefication wavefronts of the sound waves, for correspondingly increasing and decreasing the thermal energy of the medium; and (b) a pyroelectric material in thermal conduction relationship with the medium to correspondingly increase and decrease the temperature of the material in response to the increase and decrease in the thermal energy of the medium, such pyroelectric material having the electrical charge distribution thereof change predominately in response to the temperature change of such material to produce the electrical signal in response to such electrical charge distribution changes.

12. The transducer recited in claim 11 wherein the medium is a fluid.

13. The transducer recited in claim 12 wherein the fluid is a compressible gas.

14. The transducer recited in claim 11 wherein the medium comprises: a flexible diaphragm; and, a compressible gas confined in a volume enclosed, in part, by the diaphragm and the pyroelectric material.

15. The transducer recited in claim 14 wherein the energy conversion medium includes thermal conductive material disposed in the gas.

16. The transducer recited in claim 14 wherein the thermal conductive material is a mesh.

17. A transducer disposed in a medium through which pressure waves are propagated, comprises means including a pyroelectric material for producing an electrical output predominately in response to thermal energy applied thereto; and means, disposed between the means for producing the electrical output and the medium through which pressure waves are propagated, for converting the pressure waves propagating in said medium into thermal energy, with said converting means being disposed in thermal energy transfer relationship with the means for producing the electrical output.

18. The transducer of claim 17 wherein the energy conversion means comprises: a flexible diaphragm; and a compressible fluid confined in a volume enclosed, in part, by the diaphragm and the electrical output means.

19. The transducer of claim 18 wherein said conversion means further comprises a mesh disposed between the flexible diaphragm and the electrical output means.

20. The transducer of claim 19 wherein the compressible fluid is a gas.

21. The transducer of claim 20 wherein the pyroelectric material comprises polyvinyldene fluoride.

22. A transducer for producing an electrical signal in response to impinging pressure waves, comprises:

at least one chamber confining a compressible fluid, said chamber comprising:

a flexible diaphragm provided to compress and rarefy the compressible fluid in response to the pressure waves and to increase and decrease, respectively, the thermal energy of the fluid; and a material having pyroelectric and piezoelectric characteristics disposed in thermal energy transfer relationship with the compressible fluid to correspondingly increase and decrease the temperature of the material in response to the increase and decrease of the thermal energy of the fluid, and to produce an electrical signal predominately as a result of the pyroelectric characteristic which predominates over a signal component produced as a result of the piezoelectric characteristic.

23. The transducer of claim 22 wherein the fluid is a gas.

24. The transducer of claim 23 wherein the chamber includes a mesh disposed between the flexible diaphragm and the pyroelectric material to provide a plurality of smaller chambers.

25. The transducer of claim 24 wherein the polymer is polyvinyldene fluoride.

26. A transducer comprising:

a membrane comprising a polymer material having a piezoelectric characteristic and a pyroelectric characteristic;

a flexible diaphragm; and a medium in thermal energy transfer relationship with the membrane which compresses and rarefies in response to compression and rarefication pressure fronts incident on the diaphragm to correspondingly increase and decrease the thermal energy of the medium and the membrane, and provide an electrical signal in accordance with the changes in thermal energy of the membrane predominately as a result of the pyroelectric characteristic of the membrane.

27. The transducer of claim 26 wherein the medium is a compressible fluid.

28. The transducer of claim 27 further comprising a mesh disposed between the flexible diaphragm and membrane to provide a plurality of confined regions of said compressible fluid.

29. The transducer of claim 28 wherein the polymer of the membrane comprises polyvinyldene fluoride.

30. The transducer of claim 26 wherein the compressible fluid is air.

31. The transducer of claim 29 wherein the compressible fluid is air.

32. A transducer, comprising:

means responsive to applied mechanical energy for converting mechanical energy into thermal energy; and means, including a material having a pyroelectric characteristic and a piezoelectric characteristic disposed in thermal energy transfer relationship with the energy converting means, for producing an electrical output signal having two components, a pyroelectric component produced by the pyroelectric characteristic of the material in response to the converted thermal energy, and a piezoelectric component produced by the piezoelectric characteristic of the material in response to any of said mechanical energy which may produce a strain in said material with the pyroelectric component predominating over the piezoelectric component by at least an order of magnitude.

33. The transducer of claim 32 wherein the material comprises polyvinyldenefluoride.

34. The transducer of claim 33 wherein the means for converting mechanical energy into thermal energy comprises:

a flexible diaphragm; and a compressible gas confined in a volume enclosed in part by the diaphragm and the means for producing an electrical output signal.

35. The transducer of claim 34 wherein the means for producing an electrical output signal further includes a pair of conductive layers disposed on opposing surfaces of said polyvinyldenefluoride.

36. The transducer of claim 35 wherein said energy converting means further includes a thermally conductive mesh disposed between the flexible diaphragm and the means for producing an electrical output signal.

37. The transducer of claim 36 wherein said transducer is disposed in a medium through which said mechanical energy propagates and wherein said means for converting mechanical energy is disposed between said medium and said means for producing an electrical output signal.

38. The transducer of claim 32 wherein said pyroelectric component predominates over the piezoelectric component by at least two orders of magnitude.

39. The transducer of claim 38 wherein the material comprises polyvinyldenefluoride.

40. The transducer of claim 39 wherein the means for converting mechanical energy into thermal energy comprises:

a flexible diaphragm; and a compressible gas confined in a volume enclosed in part by the diaphragm and the means for producing an electrical output signal.

41. The transducer of claim 40 wherein the means for producing an electrical output signal further includes a pair of conductive layers disposed on opposing surfaces of said polyvinyldenefluoride.

42. The transducer of claim 41 wherein said energy converting means further includes a thermally conductive mesh disposed between the flexible diaphragm and the means for producing an electrical output signal.

43. The transducer of claim 42 wherein said transducer is disposed in a medium through which said mechanical energy propagates and wherein said means for converting mechanical energy is disposed between said medium and said means for producing an electrical output signal.

44. The transducer of claim 32 wherein said pyroelectric component predominates over the piezoelectric component by at least three orders of magnitude.

45. The transducer of claim 44 wherein the material comprises polyvinyldenefluoride.

46. The transducer of claim 45 wherein the means for converting mechanical energy into thermal energy comprises:

a flexible diaphragm; and a compressible gas confined in a volume enclosed in part by the diaphragm and the means for producing an electrical output signal.

47. The transducer of claim 46 wherein the means for producing an electrical output signal further includes a pair of conductive layers disposed on opposing surfaces of said polyvinyldenefluoride.

48. The transducer of claim 47 wherein said energy converting means further includes a thermally conductive mesh disposed between the flexible diaphragm and the means for producing an electrical output signal.

49. The transducer of claim 48 wherein said transducer is disposed in a medium through which said mechanical energy propagates and wherein said means for converting mechanical energy is disposed between said medium and said means for producing an electrical output signal.

* * * * *